US008638556B2

(12) United States Patent
Allen et al.

(10) Patent No.: US 8,638,556 B2
(45) Date of Patent: Jan. 28, 2014

(54) ELECTRONIC DEVICE INCLUDING A FRONT BEZEL OPERABLE TO SECURE THE DEVICE TOGETHER

(75) Inventors: Aaron Robert Allen, Pembroke Pines, FL (US); Paul Brian Koch, Plantation, FL (US); Marko Antonio Escalante, Miramar, FL (US); Douglas Wayne Moskowitz, Weston, FL (US); Sacha Benjamin Holland, Sunrise, FL (US)

(73) Assignee: BlackBerry Limited, Waterloo (CA)

( * ) Notice: Subject to any disclaimer, the term of this patent is extended or adjusted under 35 U.S.C. 154(b) by 119 days.

(21) Appl. No.: 13/027,086

(22) Filed: Feb. 14, 2011

(65) Prior Publication Data

US 2012/0039029 A1    Feb. 16, 2012

Related U.S. Application Data

(60) Provisional application No. 61/304,709, filed on Feb. 15, 2010.

(51) Int. Cl.
*H05K 5/03* (2006.01)

(52) U.S. Cl.
USPC ............... 361/679.56; 361/679.01; 455/575.4

(58) Field of Classification Search
USPC ................... 248/917–924; 455/575.1–575.4; 341/22–33; 400/472–496; 345/168–172; 361/679.01, 679.02, 361/679.08, 679.09, 679.26, 724–727, 361/679.55–679.58, 816, 818, 680–683
See application file for complete search history.

(56) References Cited

U.S. PATENT DOCUMENTS

| | | | | |
|---|---|---|---|---|
| 5,422,751 | A * | 6/1995 | Lewis et al. .................... | 349/59 |
| 5,848,152 | A | 12/1998 | Slipy et al. | |
| 6,177,881 | B1 * | 1/2001 | Castaneda et al. ............ | 340/7.6 |
| 7,162,283 | B2 | 1/2007 | Bae et al. | |
| 7,577,352 | B2 * | 8/2009 | Chang ........................... | 396/144 |
| 2007/0197270 | A1 | 8/2007 | Kim | |
| 2008/0031612 | A1 | 2/2008 | Chang | |
| 2008/0081246 | A1 | 4/2008 | Lee et al. | |
| 2009/0257207 | A1 | 10/2009 | Wang et al. | |
| 2010/0120480 | A1 * | 5/2010 | Jung et al. .................. | 455/575.4 |
| 2011/0086683 | A1 * | 4/2011 | Kfoury ....................... | 455/575.4 |

OTHER PUBLICATIONS

Extended European Search Report issued Jun. 8, 2011 in respect of corresponding EP Application No. 11154320.3.

* cited by examiner

*Primary Examiner* — Jinhee Lee
*Assistant Examiner* — Ingrid Wright
(74) *Attorney, Agent, or Firm* — Novak Druce Connolly Bove + Quigg LLP

(57) ABSTRACT

In some aspects, a portable electronic device is provided having a slidable upper housing movable relative to a lower housing between an open position and a closed position, and a front bezel. The front bezel holds the components of the portable electronic device together and covers up at least some of the fasteners used to attach components of the portable electronic device.

11 Claims, 14 Drawing Sheets

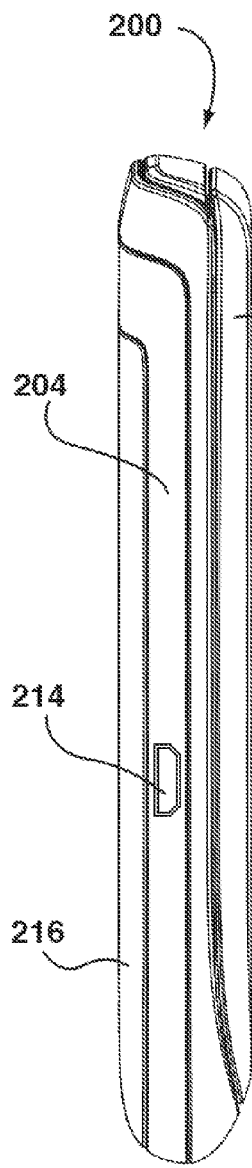
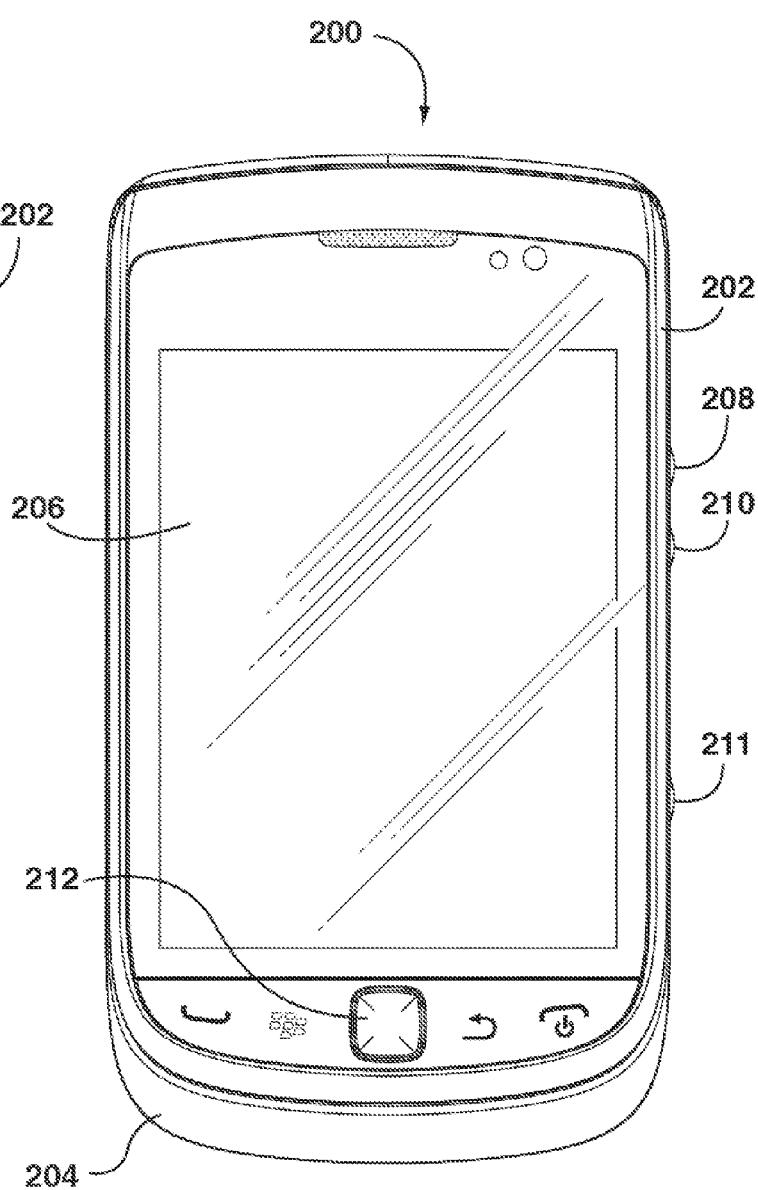
FIG. 2
FIG. 3

ELECTRONIC DEVICE INCLUDING A FRONT BEZEL OPERABLE TO SECURE THE DEVICE TOGETHER

RELATED APPLICATIONS

This application claims the benefit of U.S. Provisional Patent Application Ser. No. 61/304,709 filed Feb. 15, 2010 and entitled ELECTRONIC DEVICE INCLUDING A FRONT BEZEL, the entire contents of which are hereby incorporated by reference herein for all purposes.

FIELD

Embodiments herein relate to portable electronic devices, and in particular to portable electronic devices having a slidable upper housing and lower housing movable between an open position and a closed position, and including a front bezel for holding the components of the portable electronic device together.

INTRODUCTION

Electronic devices, including portable electronic devices, have gained widespread use and may provide a variety of functions including, for example, telephonic, electronic text messaging and other personal information manager (PIM) application functions. Portable electronic devices can include several types of devices including mobile stations such as simple cellular phones, smart phones, Personal Digital Assistants (PDAs), tablets and laptop computers.

Devices such as PDAs or smart phones are generally intended for handheld use and ease of portability. Smaller devices are generally desirable for portability. Touch-sensitive devices constructed of a display, such as a liquid crystal display (LCD), with a touch-sensitive overlay may be useful on handheld devices as such handheld devices are small and are therefore limited in space available for user input and output devices. Further, the screen content on the touch-sensitive devices can be modified depending on the functions and operations being performed.

BRIEF DESCRIPTION OF THE DRAWINGS

Embodiments of the present disclosure will now be described, by way of example only, with reference to the attached Figures, wherein:

FIG. 2 is a first side view of a portable electronic device according to one embodiment shown in a closed position;

FIG. 3 is a front view of the portable electronic device of FIG. 2;

DETAILED DESCRIPTION

Figure 1:
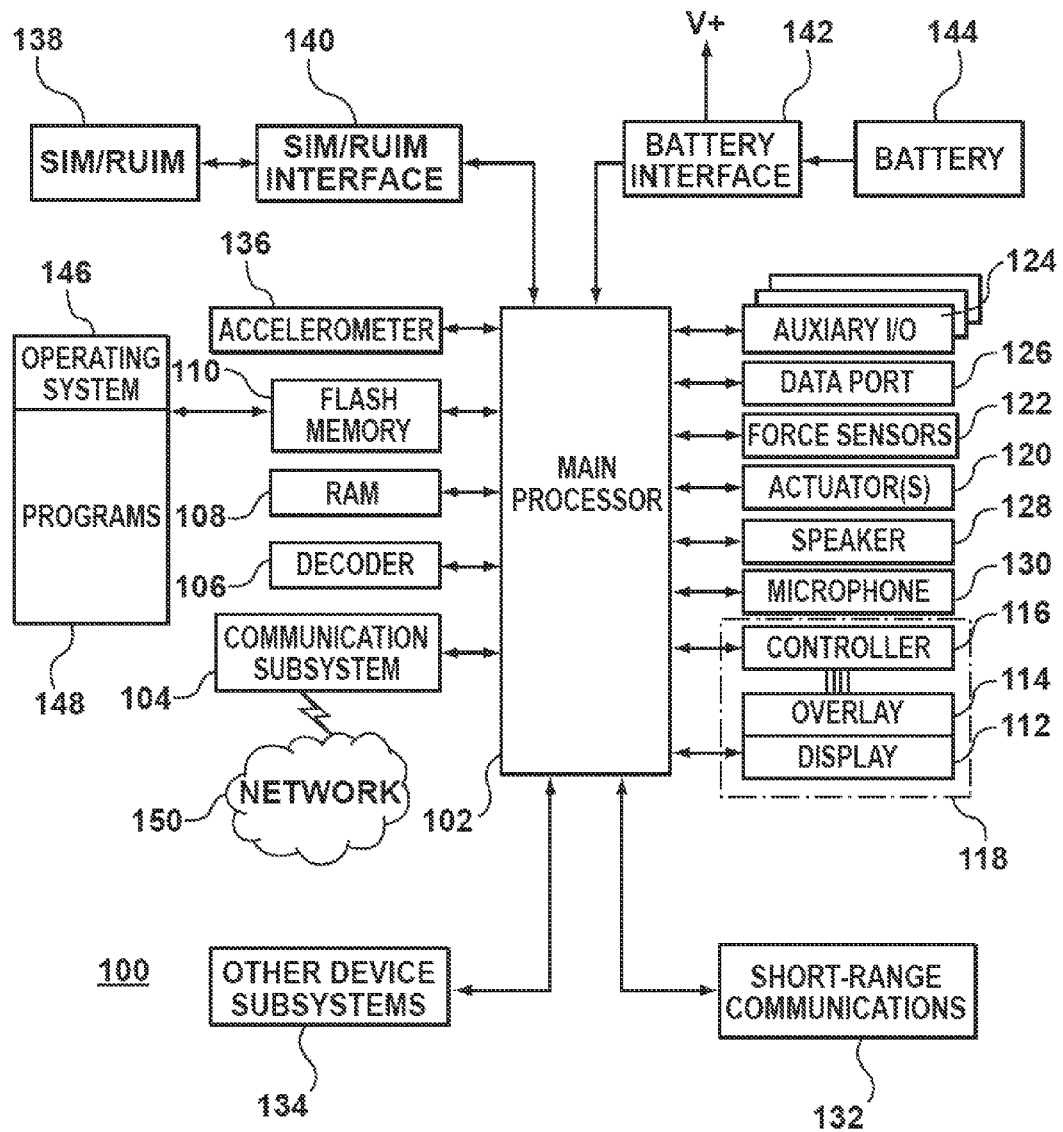
FIG. 1 is a simplified block diagram of components including internal components of a portable electronic device according to one embodiment.
Figures 4, 5:
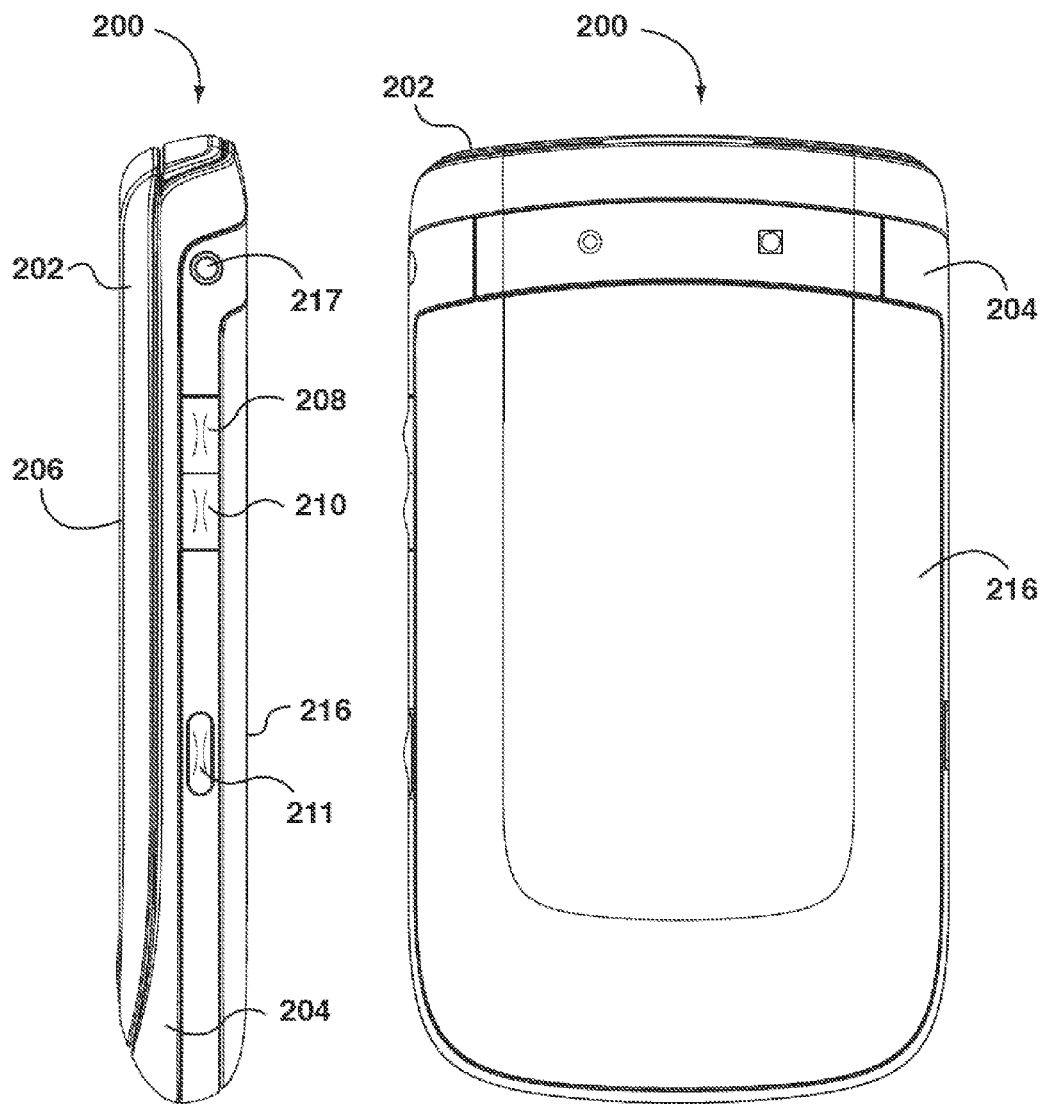
FIG. 4 is a second side view of the portable electronic device of FIG. 2.
FIG. 5 is a back view of the portable electronic device of FIG. 2.

The following describes an electronic device that includes a housing, a touch-sensitive display exposed by a front of the housing, and functional components comprising memory and a processor coupled to the memory and the touch-sensitive display.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

FIG. 1 shows a simplified block diagram of components including internal components of a portable electronic device according to one embodiment.

The portable electronic device 100 includes multiple components such as a processor 102 that controls the operations of the portable electronic device 100. Communication functions, including data communications, voice communications, or both may be performed through a communication subsystem 104. Data received by the portable electronic device 100 may be decompressed and decrypted by a decoder 106. The communication subsystem 104 may receive messages from and send messages to a wireless network 150.

The wireless network 150 may be any type of wireless network, including, but not limited to, data-centric wireless networks, voice-centric wireless networks, and dual-mode networks that support both voice and data communications over the same base stations.

The portable electronic device 100 may be a battery-powered device and as shown includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together comprise a touch-sensitive display 118, an actuator assembly 120, one or more optional force sensors 122, an auxiliary input/output (I/O) subsystem 124, a data port 126, a speaker 128, a microphone 130, short-range communications 132 and other device subsystems 134.

User-interaction with the graphical user interface may be performed through the touch-sensitive overlay 114. The processor 102 may interact with the touch-sensitive overlay 114 via the electronic controller 116. Information, such as text, characters, symbols, images, icons, and other items that may be displayed or rendered on a portable electronic device, may be displayed on the touch-sensitive display 118 via the processor 102.

The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the portable electronic device 100 may use a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110 or performed using other techniques.

The portable electronic device 100 also includes an operating system 146 and software components 148 that may be executed by the processor 102 and which may be stored in a persistent store, such as the flash memory 110. Additional applications may be loaded onto the portable electronic device 100 through the wireless network 150, the auxiliary I/O subsystem 124, the data port 126, the short-range communications subsystem 132, or other suitable device subsystems 134.

In use, a received signal such as a text message, an e-mail message, or web page download may be processed by the communication subsystem 104 and input to the processor 102. The processor 102 may then process the received signal for output to the display 112 or alternatively to the auxiliary I/O subsystem 124. A subscriber may also compose data items, such as e-mail messages, for example, which may be transmitted over the wireless network 150 through the communication subsystem 104.

For voice communications, the overall operation of the portable electronic device 100 may be similar. The speaker 128 outputs audible information converted from electrical signals, and the microphone 130 converts audible information into electrical signals for processing.

Turning now to FIGS. 2 to 10, illustrated generally therein is a portable electronic device 200 according to one embodiment.

Figures 6, 7:
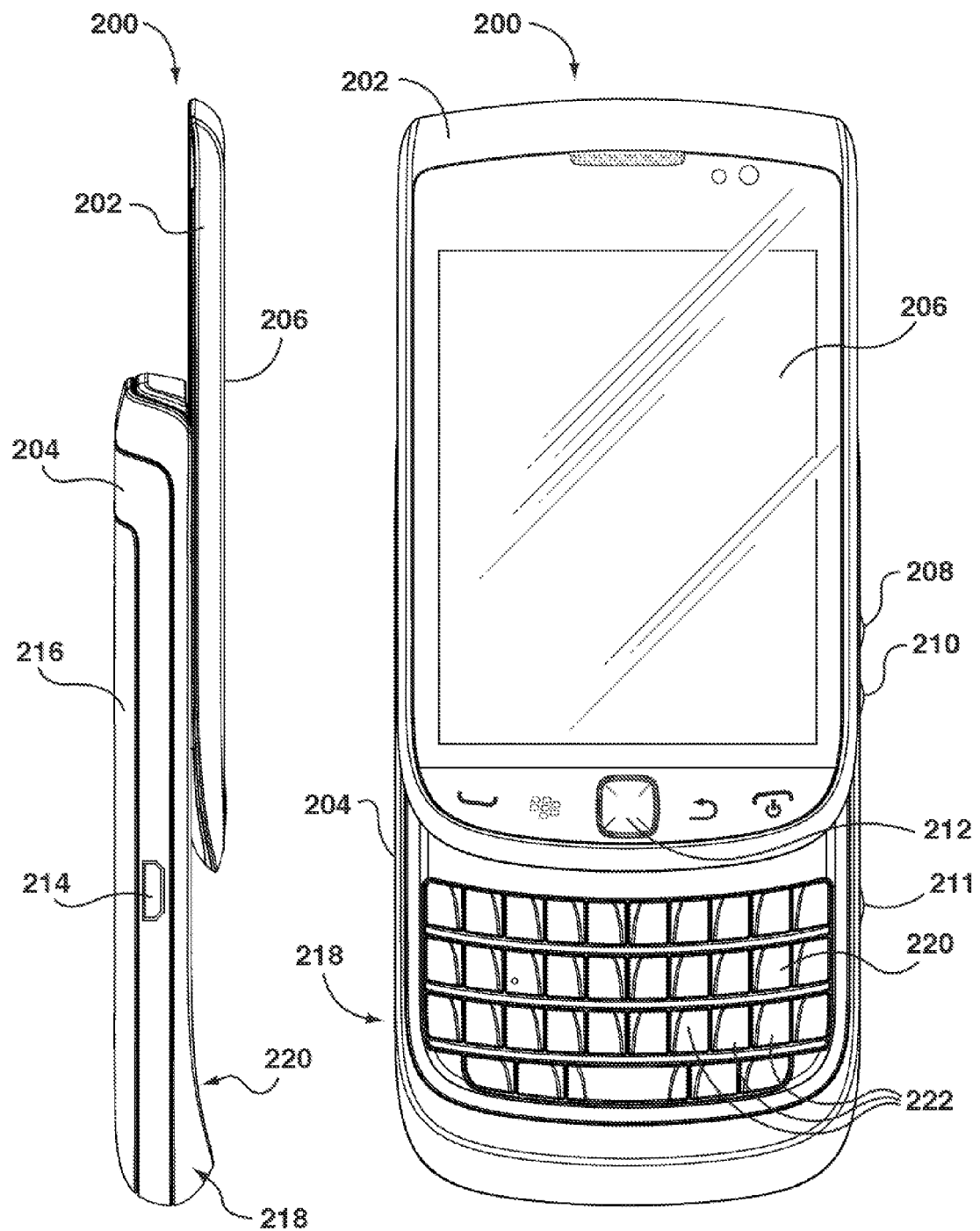
FIG. 6 is a first side view of the portable electronic device of FIG. 2 shown in an open position.
FIG. 7 is a front view of the portable electronic device of FIG. 6.
Figures 8, 9:
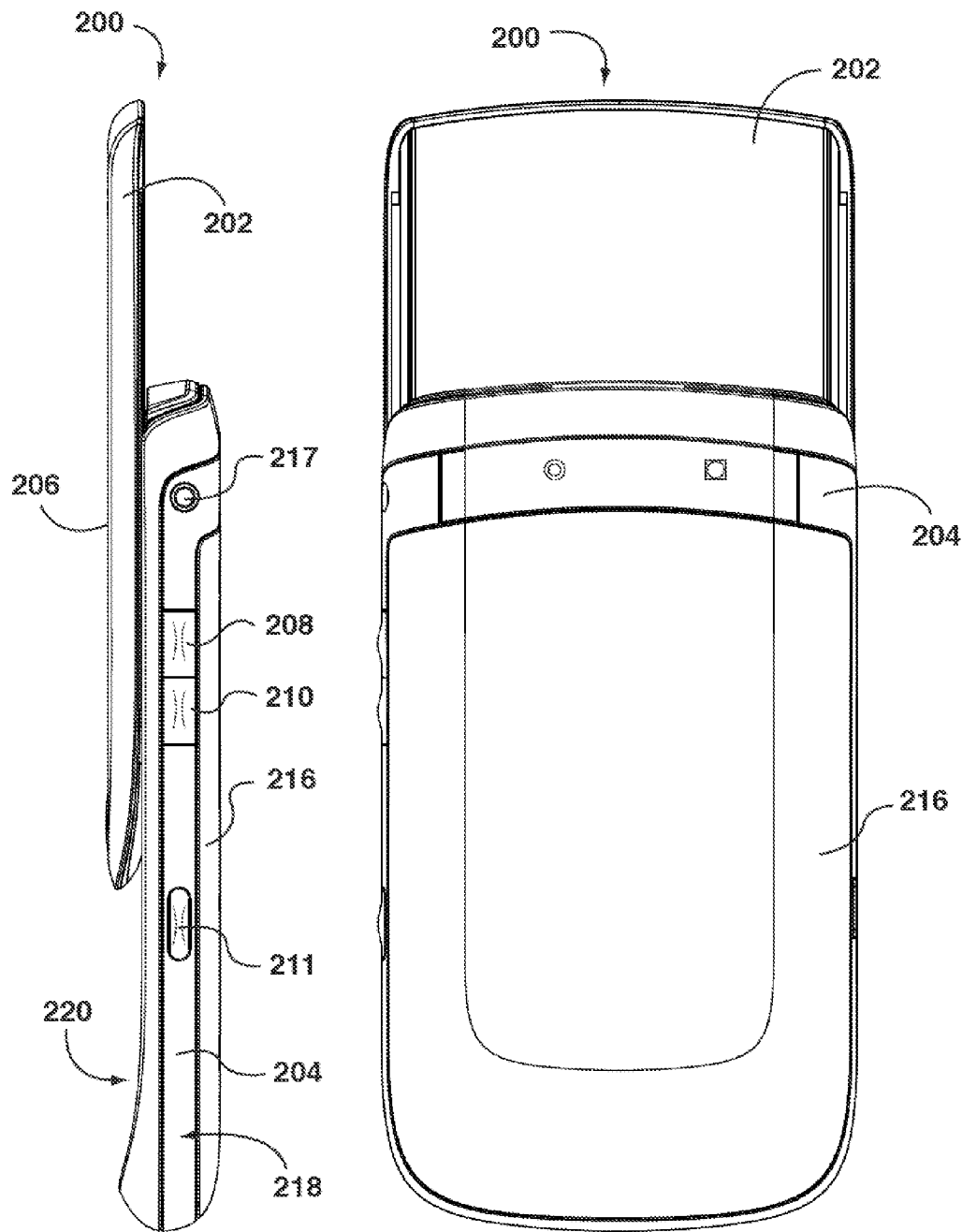
FIG. 8 is a second side view of the portable electronic device of FIG. 6.
FIG. 9 is a back view of the portable electronic device of FIG. 6.
Figure 10:
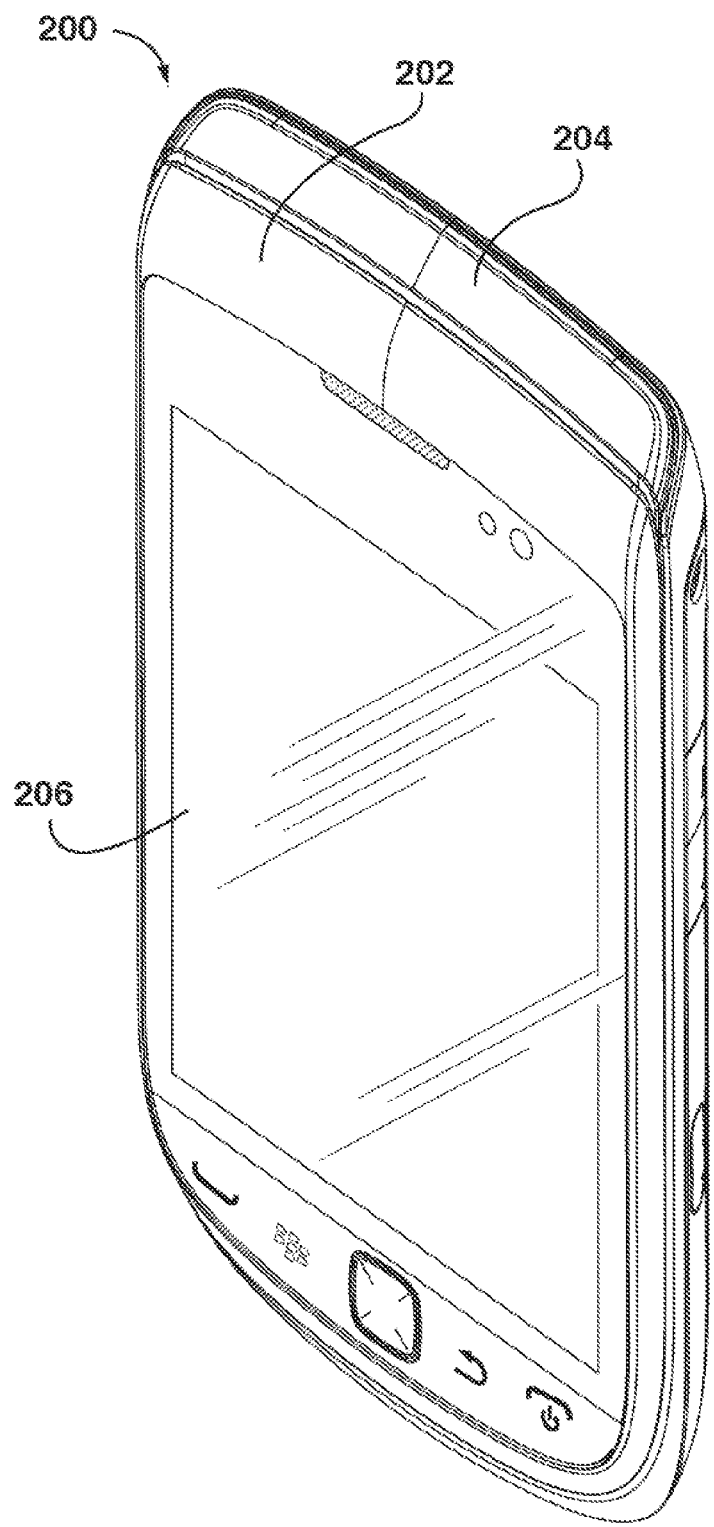
FIG. 10 is a perspective view of the portable electronic device of FIG. 2 shown in the closed position.
Figure 11:
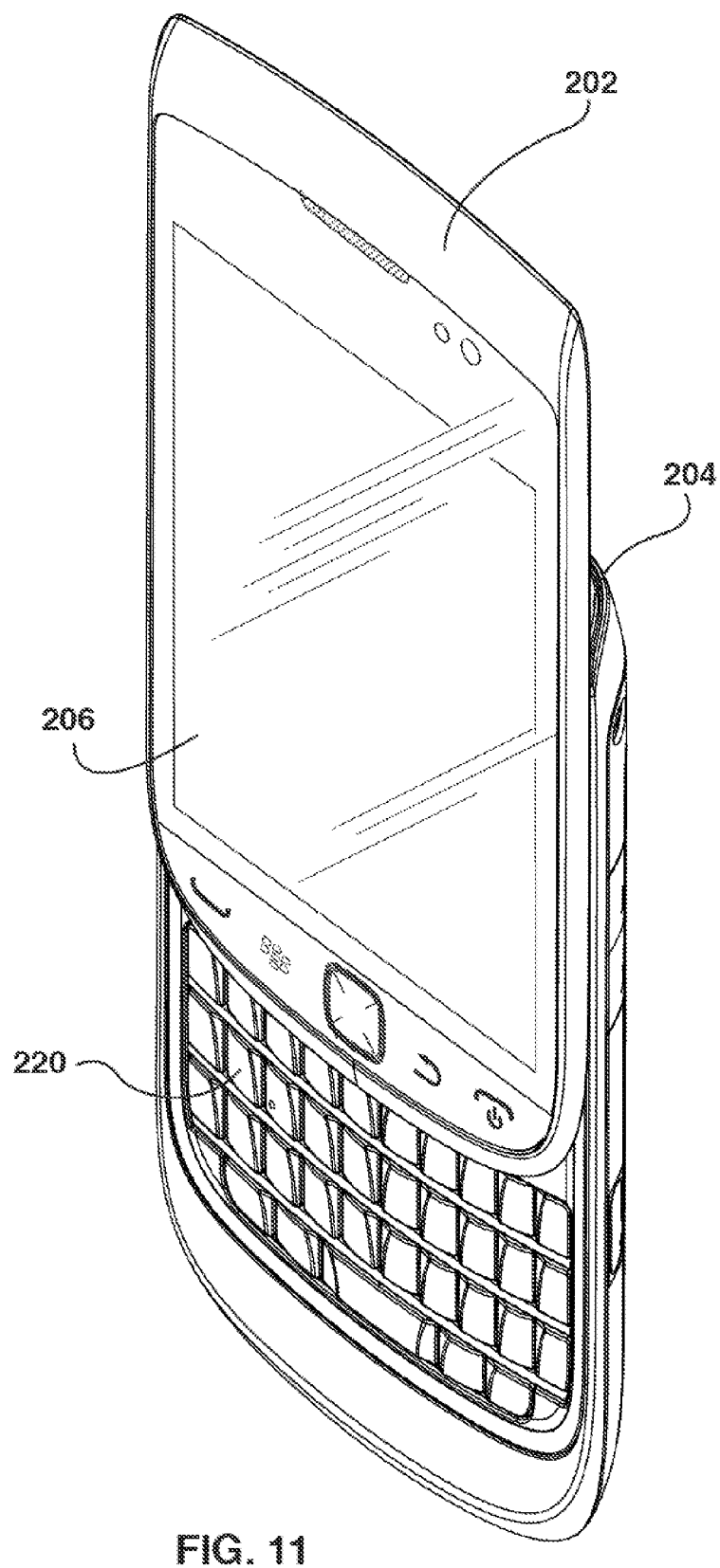
FIG. 11 is a perspective view of the portable electronic device of FIG. 6 shown in the open position.

The portable electronic device 200 generally includes an upper housing 202 (or sliding portion) and a lower housing 204 (or base portion). The upper housing 202 and lower housing 204 are coupled together and are slidable between a closed position (as shown in FIG. 2) and an open position (e.g. as shown in FIG. 6).

As shown, the upper housing 202 generally includes a display 206, which could be an LCD display and which may have touch screen capabilities.

As shown, one or both of the upper housing 202 and lower housing 204 may include one or more input apparatus, such as navigation keys or buttons, a physical or virtual keyboard, a trackpad, trackball, multimedia keys, etc.

For example, the upper housing 202 as shown includes an auxiliary input device 212. As shown, the auxiliary input device may be an optical navigation module (e.g. a trackpad) that responds to user interaction, and which may be used for navigating around the display screen 206, to select objects on the display screen, or for other purposes. In some other embodiments, the auxiliary input device 212 may be a mechanical device that responds to user interaction (e.g. a trackball).

The display 206 and the auxiliary input device 212 are generally disposed on a front of the upper housing 202 and exposed for user accessibility when the portable electronic device 200 is in either of the open or closed positions.

The upper housing 202 may also include other input devices, such as a dedicated phone application button, a dedicated "disconnect call" button, a home screen button, etc. In various embodiments, these input devices may include optical sensors, mechanical buttons, or both.

Turning now to the lower housing 204, the lower housing 204 may include various buttons and other controls, such as buttons 208 and 210, and which could be used for navigation, to control volume or for other purposes.

The lower housing 204 could also include one or more application buttons 211 that can be used to automatically launch a particular application on the portable electronic device (e.g. a camera application, a phone application, etc.). In some embodiments, the button 211 may be configurable by a user (e.g. the user may be able to select the particular application launched by the button 211).

As shown in FIGS. 2 and 6, the lower housing 204 could also include one or more input or output ports, (e.g. I/O ports), such as a microUSB port 214. In some examples, the port 214 may be used for data communication with the portable electronic device 200, for charging of a battery (not shown) on the device 200 or for both.

As shown, the lower housing 204 may also include a battery cover 216 for covering the battery (not shown). In some embodiments, the battery cover 216 may be removable. In other embodiments, the battery cover 216 may be permanently fixed to the device.

In some embodiments, the lower housing 204 may also include an audio jack 217. The audio jack 217 may be used to couple the portable electronic device 200 to a speaker, a microphone, or both, for example for use in voice communication.

Turning now to FIGS. 6 to 9, as shown when the portable electronic device 200 is in the open position, a keypad 220 is exposed on a lower portion 218 of the lower housing 204. The keypad 220 generally includes a plurality of alphanumeric keys 222, which may be positioned in a plurality of rows and columns. In some embodiments, the keys 222 may represent the alphabet and may be arranged with a standard keyboard layout (e.g. QWERTY, QWERTZ, DVORAK, etc.)

As shown in FIGS. 2 to 5, when the portable electronic device 200 is in the closed position, the keypad 220 is covered by the upper housing 202. This may be beneficial as it may protect the keypad 220 when not in use, and may also inhibit undesired keys from being pressed when the user is carrying the portable electronic device 200 (e.g. in a user's pocket). However, in some cases (e.g. when the display 206 is a touchscreen) the user may be able to perform functions on the portable electronic device 200 while the device 200 is closed by interacting with the display screen 206 (e.g. using buttons 208, 210, 211, the auxiliary input device 212, the display screen 206 itself, etc.).

When the portable electronic device 200 is in the open position (as shown in FIGS. 6 to 9), the keypad 220 is exposed for user accessibility.

In some embodiments, the display 206 may be a touch-sensitive display. The touch-sensitive display may be a capacitive touch-sensitive display, for example, and a user's touch on the touch-sensitive display may be determined by determining an X and Y location of the touch, with the X location determined by a signal generated as a result of capacitive coupling with a touch sensor layer and the Y location determined by the signal generated as a result of capacitive coupling with another touch sensor layer. Each of the touch-sensor layers provides a signal to a controller that represents the respective X and Y touch location values. Thus a feature such as a virtual button or other feature displayed on the touch-sensitive display may be selected by a mapping of the touch location to a feature on the touch-sensitive display.

In some embodiments, the portable electronic device 200 is generally taller than it is wide. In such embodiments, as the portable electronic device 200 moves between the open position and the closed position, the upper housing 202 and lower housing 204 move along a longitudinal axis of the portable electronic device 200.

Figure 12:
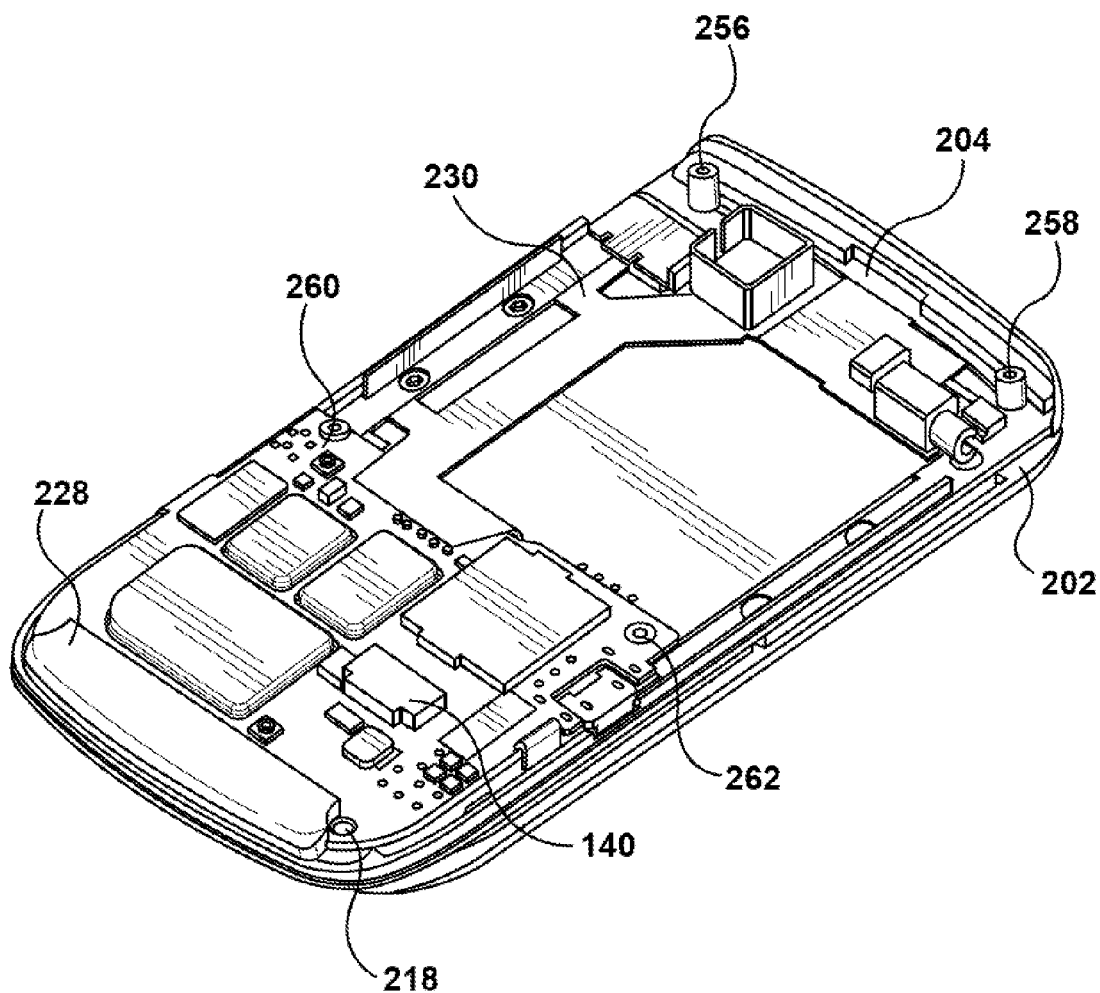
FIG. 12 is a rear view of the portable electronic device of FIG. 10 with a battery cover and a rear cover removed.

Reference is now made to FIG. 12, which illustrates a rear perspective view of the lower housing 204 of the portable electronic device 200 with the battery cover 216 and a rear cover 226 (see FIG. 13) removed. The lower housing 204 of the portable electronic device 200 (with the battery cover 216 and the rear cover 226 removed) will be referred to herein as the main portion of the lower housing 204 or simply the lower housing 204.

As can be seen in FIG. 12, the main portion of the lower housing 204 includes an antenna 228 (which may be part of the communications subsystem 104), which may be used for sending and receiving voice communications, or data communications, or both. As shown, the antenna 228 is provided in the lower portion 218 of the lower housing 204. In some embodiments the antenna 228 may be tucked behind and abut an inner surface of the lower housing 204.

The main portion of the lower housing 204 may also include a printed circuit board (PCB) 230. The PCB 230 may include various electronic components as will be understood by a person skilled in the art, including for example a processor (which could be processor 102), a memory (which could be RAM 108 or flash memory 110), and the SIM/RUIM interface 140, which may be used for receiving a SIM/RUIM card and for communication with the wireless network 150.

Figure 13:
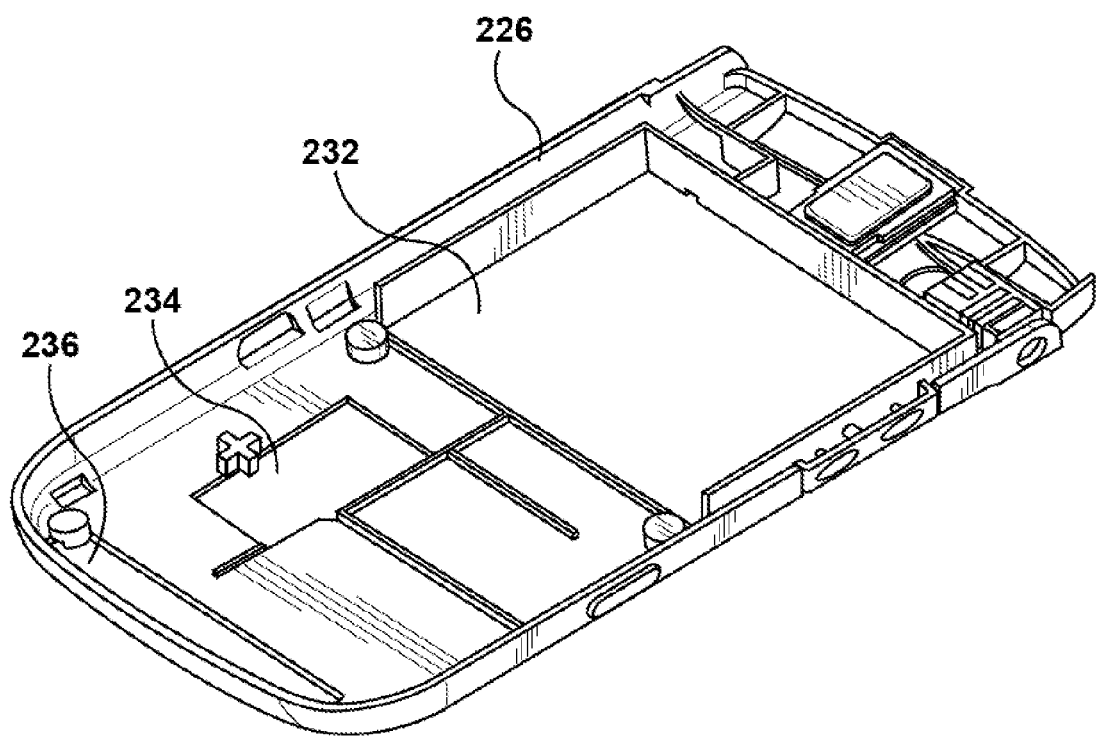
FIG. 13 is a front view of the rear cover.

Reference is now made to FIG. 13, which illustrates a front perspective view of the rear cover 226. The rear cover 226 includes three cut-outs 232, 234, and 236 (generally being defined as open regions in the material of the cover 226 and which may be formed as openings when the cover 226 is manufactured).

The first cut-out 232 works in conjunction with the lower housing 204 to form a battery opening 238 (shown in FIG. 15) for receiving a battery (e.g. battery 144), although the battery is not shown in the Figures.

The second cut-out 234 allows for exposure of the SIM/RUIM interface 140 when the rear cover 226 is mounted to the lower housing 204.

The third cut-out 236 allows for exposure of the antenna 228 when the rear cover 226 is mounted to the lower housing 204.

Generally, these cut-outs 232, 234, and 236 allow for easy access to the battery opening 238, the SIM/RUIM interface 140, and the antenna 228 when the battery cover 216 of the device 200 is removed.

Figure 14:
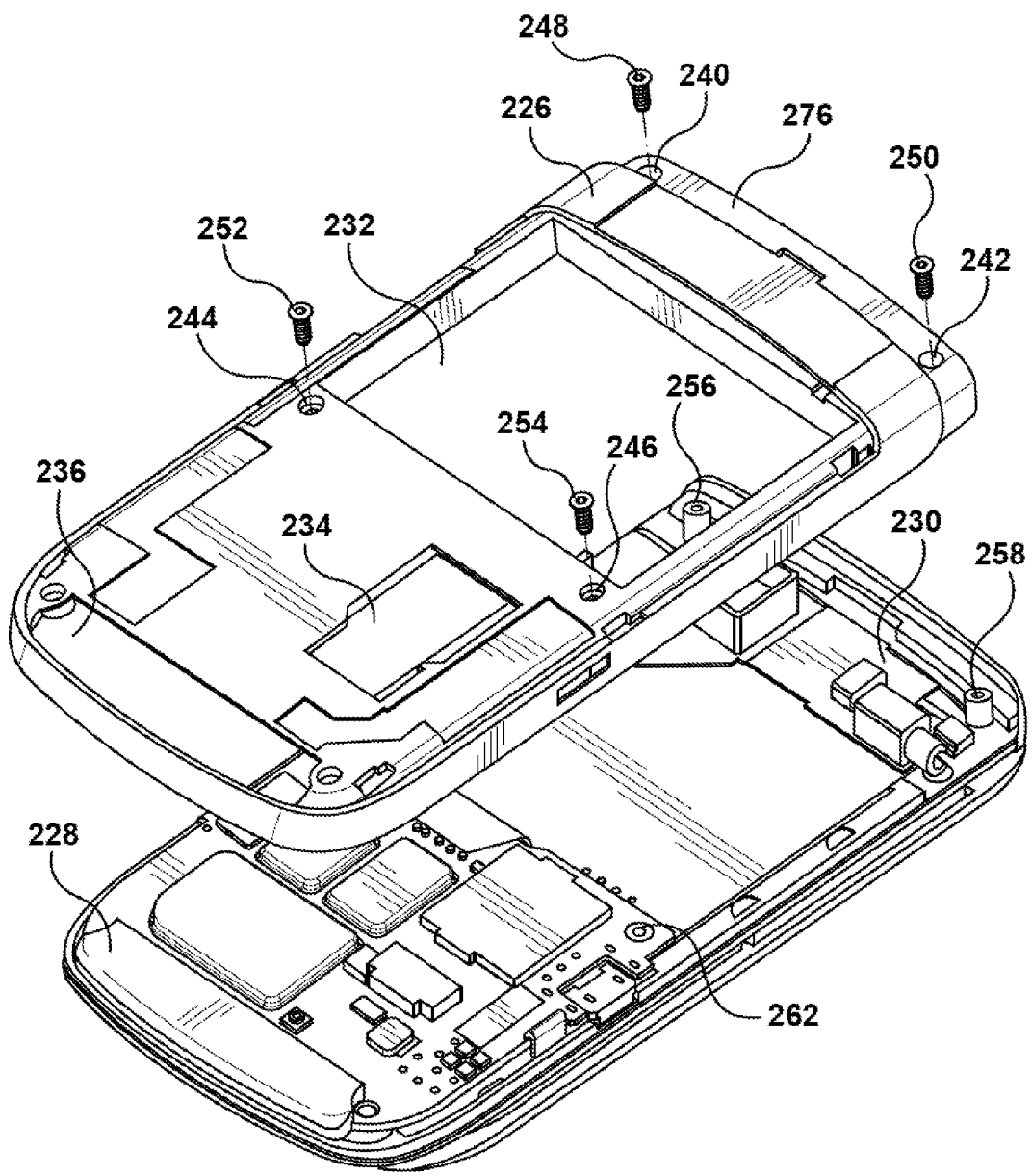
FIG. 14 is a rear view of the portable electronic device of FIG. 12 and a rear view of the rear cover of FIG. 13.

Reference is now made to FIG. 14, which is an exploded rear perspective view of the main portion of the lower housing 204 and a rear perspective view of the rear cover 226. FIG. 14 is used to demonstrate how the rear cover 226 may be attached to the lower housing 204.

In particular, as shown in FIG. 14, the rear cover 226 may have four small apertures 240, 242, 244 and 246 (although a greater or lesser number of apertures may in some cases be used). Each of these apertures 240, 242, 244 and 246 is sized and configured to receive a fastener 248, 250, 252 and 254. In some embodiments, the fasteners 248, 250, 252 and 254 are screws (as shown), however, it will be evident to those of skill in the art that other known fasteners may also be used.

The rear cover 226 may be placed over the rear portion of the lower housing 204 and the fasteners (i.e. screws) 248, 250, 252 and 254 received in corresponding apertures 256, 258, 260 and 262 in the lower housing 204 (see also FIG. 12) to attach the rear cover 226 to the lower housing 204.

Figure 15:
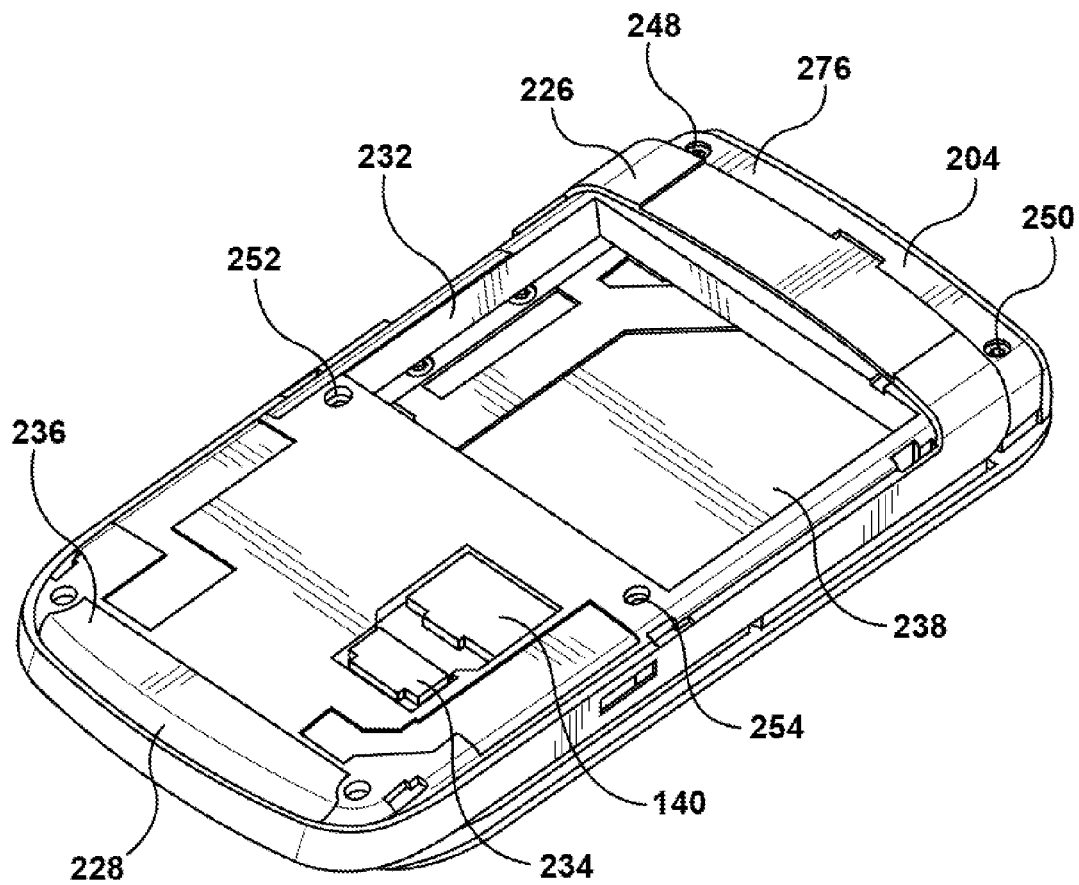
FIG. 15 is a rear view of the portable electronic device of FIG. 12 with the rear cover attached.

Reference is now made to FIG. 15, which is a rear perspective view of the lower housing 204 with the rear cover 226 attached, and the battery cover 216 removed. As can be seen in FIG. 15, when the rear cover 226 is attached to the lower housing 204 via the fasteners (i.e. screws) 248, 250, 252 and 254, the cut-outs 232, 234, and 236 in the rear cover 226 leave the battery opening 238, the SIM/RUIM interface 140, and the antenna 228 exposed. This tends to allow easy access to the battery opening 238, the SIM/RUIM interface 140 and the antenna 228 when the battery cover 216 is removed.

It also can been seen in FIG. 15, that when the rear cover 226 is attached to the lower housing 204, at least a portion of each of the fasteners 248, 250, 252 and 254 is exposed. Once the battery cover 216 is attached to the lower housing (not shown), the two lower fasteners 252 and 254 are covered. However, the two top fasteners 248 and 250 are still exposed even after the battery cover 216 is installed or attached to the lower housing 204. This is generally undesirable, as it can interfere with the aesthetic appearance of the device 200. Furthermore, it may allow the fasteners 248, 250 to be easily tampered with, which is also undesirable.

To address this issue, in some embodiments, the portable electronic device 200 includes a front bezel 264 (see FIGS. 16 to 18) that secures the rear cover 226 to the lower housing 204 and also covers the two top fasteners 248 and 250. In some existing portable electronic devices, the issue of exposed fasteners is resolved by (i) installing the two top fasteners (i.e. fasteners 248 and 250) on the front face of the portable electronic device and then covering the fasteners with a cosmetic piece; or, (ii) using an additional cosmetic piece to cover the fasteners on the rear face.

However, the first solution (i.e. installing the two top fasteners on the front face of the portable electronic device) may not be feasible when the portable electronic device has a slidable upper housing (i.e. upper housing 202) movable relative to a lower housing (i.e., lower housing 204) between an open position and a closed position. Specifically, when the rear cover (i.e. rear cover 226) is assembled or attached to the lower housing (i.e. lower housing 204), the upper housing (i.e. upper housing 202) may already be in position making it difficult to install top fasteners on the front face of the lower housing.

The second solution, using an additional cosmetic piece to cover the fasteners, may also be less than ideal. Specifically, this solution adds an additional component that increases the complexity and cost of the portable electronic device. Furthermore, the addition of a cosmetic piece to cover the top fasteners may disrupt a seamless design intent that industrial design desires. For example, an additional cosmetic piece may add visible seams to the design that may not be desired.

Figure 16:
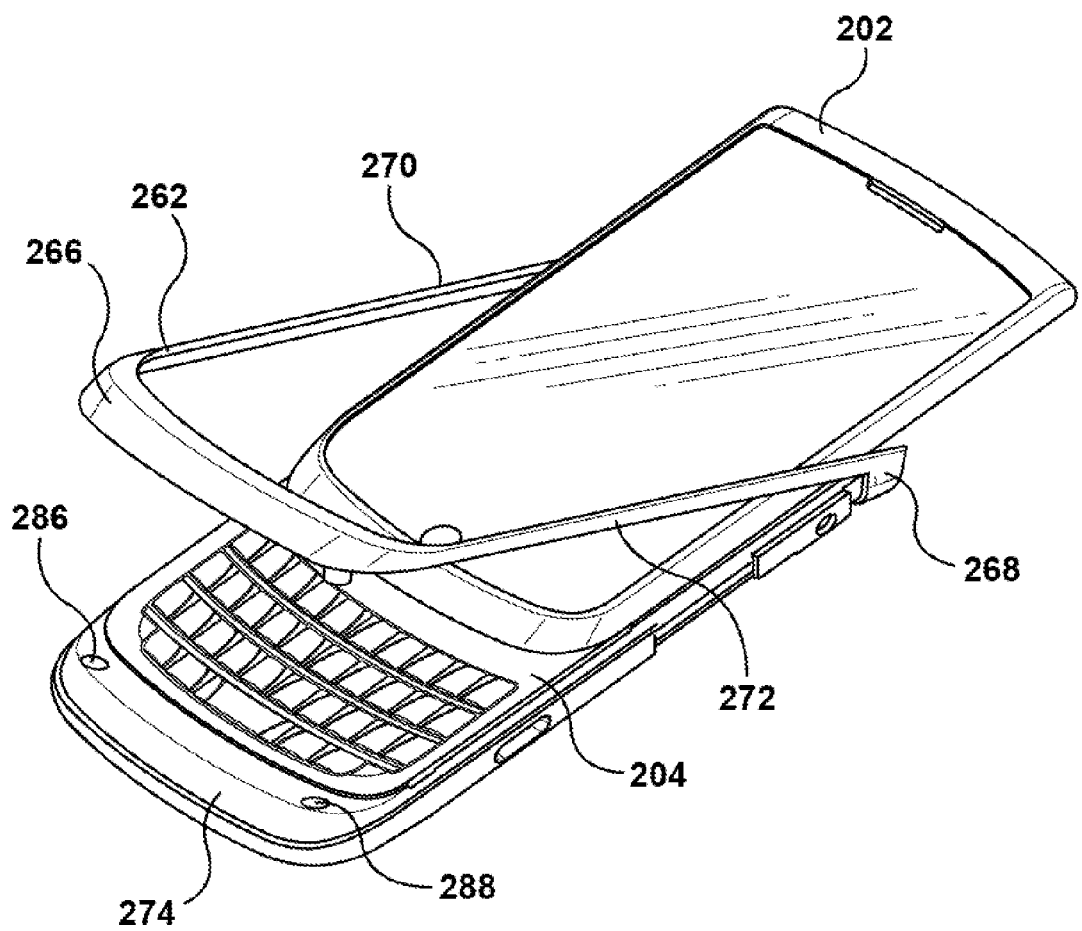
FIG. 16 is a front view of the portable electronic device of FIG. 2 with a front bezel partially positioned on the portable electronic device.

Reference is now made to FIG. 16, which is a front perspective view of the portable electronic device 200 in the open position, with the front bezel 264 partially positioned on the portable electronic device 200. FIG. 16 is used to demonstrate how the front bezel 264 is attached to the lower housing 204.

As shown, the front bezel 264 includes a front portion 266, a rear portion 268 and two side portions 270 and 272 that together generally form a closed loop or "ring" shaped member. When the front bezel 264 is positioned on the portable electronic device 200, the front portion 266 covers a lower portion 274 of the front face of the lower housing 204, the two side portions 270 and 272 lie along (and cover) the sides of the lower housing 204, and the rear portion 268 covers an upper portion 276 (See FIGS. 14 and 15) of the lower housing 204/rear cover 226. The upper portion 276 of the rear cover 226 includes the two top fasteners 248 and 250. In this manner the front bezel 264 performs two benefits: (i) it acts as a clamp by holding the lower housing 204 and the rear cover 226 in position (generally securing them together); and (ii) it performs a cosmetic function by covering the two upper fasteners 248 and 250.

In one embodiment, the front bezel 264 is made of a nonconductive vacuum metallization (NCVM) material. As is known to persons of skill in the art, the NCVM process deposits a thin nonconductive metal on a resin surface, such as plastic. One of the benefits of NCVM material is that the thin nonconductive metal does not interfere with radio frequency transmissions. Accordingly, a NCVM material allows the front bezel 264 to look like metal without having the adverse affects an actual metal might have. Specifically, when made of NCVM material, the front bezel 264 does not affect the radio frequency (RF) transmissions of the antenna 228 in the same manner that a metal bezel would. This may be particularly important due to the proximity of the front bezel 264 to the antenna 228.

Figure 17:
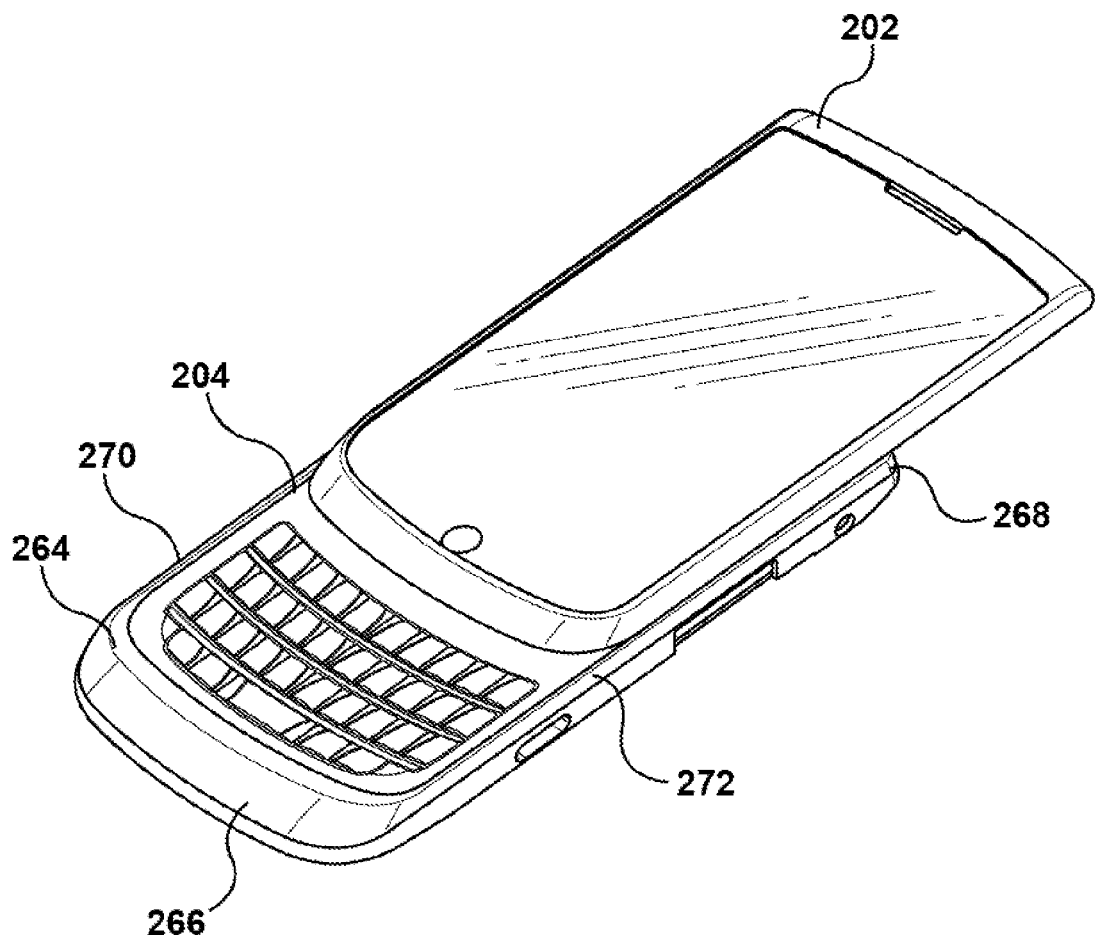
FIG. 17 is a front view of the portable electronic device of FIG. 16 with the front bezel fully positioned on the portable electronic device.

Reference is now made to FIG. 17, which is a front perspective view of the portable electronic device 200 in the open position, with the front bezel 264 fully positioned on the portable electronic device 200.

Figure 18:
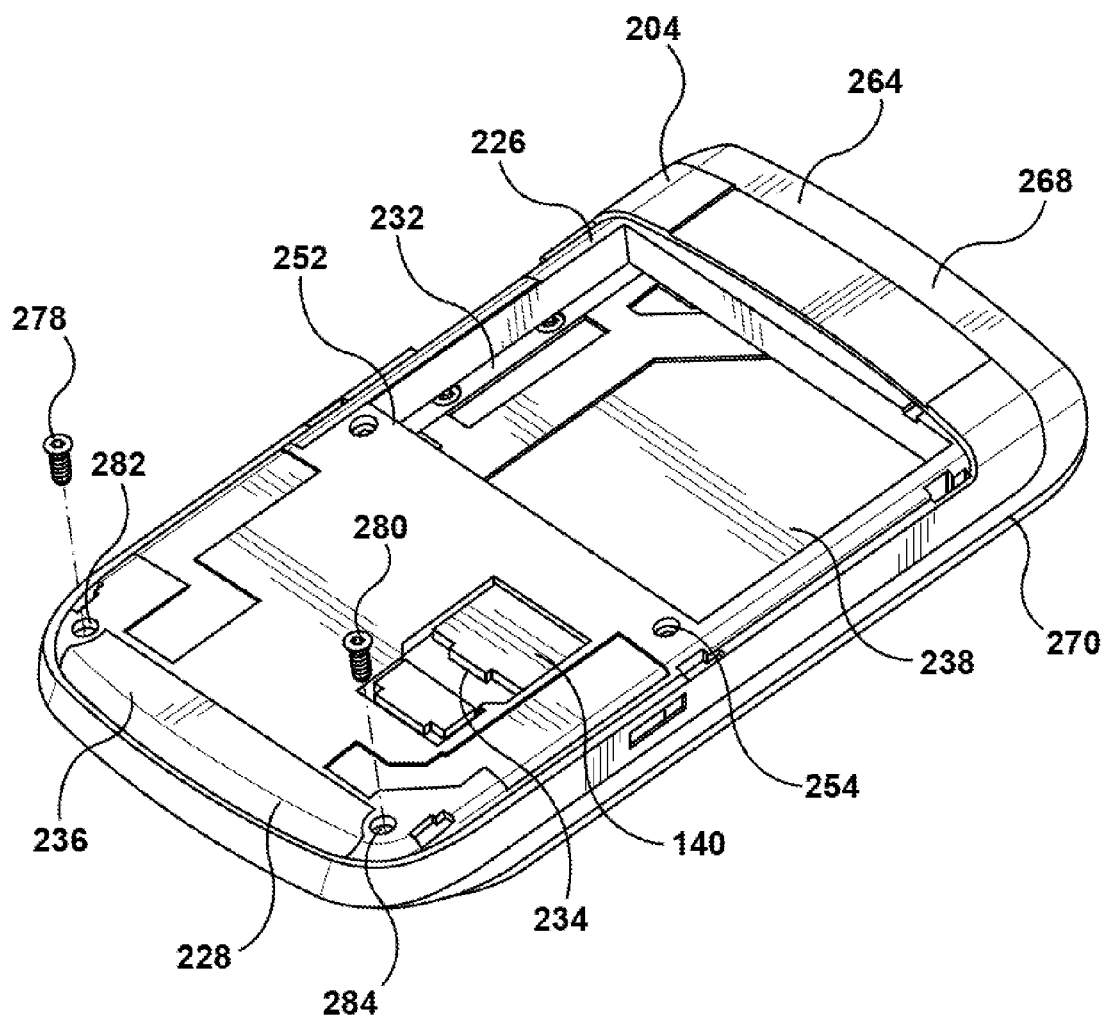
FIG. 18 is a rear view of the portable electronic device of FIG. 17.

Reference is now made to FIG. 18, which is a rear view of the portable electronic device 200 in the closed position, with the front bezel 264 fully positioned on the portable electronic device 200 and the battery cover 216 removed. It can be seen in FIG. 18, that when the front bezel 264 is fully positioned on the portable electronic device 200, the rear portion 268 of the front bezel 264 completely covers the upper portion 276 of the rear cover 226 including the two top fasteners 248 and 250.

Once the front bezel 264 is fully positioned on the portable electronic device 200, the front bezel 264 may be attached to the lower housing 204 via one or more bezel fasteners 278 and 280 (i.e. screws). Although FIG. 18 shoes the front bezel 264 being attached to the lower housing 204 using two screws, it will be evident to a person of skill in the art that other types and numbers of fasteners may be used.

The two fasteners 278 and 280 may be inserted into two small apertures 282 and 284 in the rear cover 226, pass through two small apertures 286 and 288 in the lower housing 204 and be received in two small apertures (not shown) in the front bezel 264.

While the above description provides examples of one or more processes or apparatuses, it will be appreciated that other processes or apparatuses may be within the scope of the accompanying claims.

The invention claimed is:

1. A portable electronic device, comprising:
a lower housing comprising a main portion and a rear cover attached to the main portion by at least one fastener, the main portion having a forward facing front face, and the rear cover having a rearward facing rear face that faces in a direction opposite to the front face and which is offset from the front face;
an upper housing coupled to the lower housing and slideable relative thereto between a closed position and an open position; and
a bezel extending around the lower housing for holding the main portion of the lower housing and the rear cover together, and for providing cosmetic coverage to the at least one fastener, the bezel comprising a front portion, a rear portion and two side portions that generally define a ring,
the bezel also comprising two side tabs, each side tab extending rearwardly from one of the side portions of the bezel and supporting the rear portion at a position that is rearwardly offset from the side portions and the front portion; and
wherein the front portion of the bezel covers a lower portion of the forward facing-front face of the main portion, the rear portion of the bezel covers an upper portion of the rearward facing rear face of the rear cover, and the two side portions cover the sides of the lower housing.

2. The portable electronic device of claim 1, wherein the at least one fastener is positioned on the upper portion of the rear face so that the rear portion of the bezel provides cosmetic coverage to the at least one fastener.

3. The portable electronic device of claim 1, wherein the at least one fastener is a screw.

4. The portable electronic device of claim 1, wherein the bezel is attached to the lower housing by at least one bezel fastener.

5. The portable electronic device of claim 1, wherein the bezel is made of a non-conductive vacuum metallization material so as to inhibit radio frequency interference of the portable electronic device.

6. A portable electronic device, comprising:
a lower housing comprising a main portion and a rear cover attached to the main portion by at least one fastener;
an upper housing coupled to the lower housing and slideable relative thereto between a closed position and an open position; and
a bezel extending around the lower housing for holding the main portion and the rear cover together, and for providing cosmetic coverage to the at least one fastener;
the bezel comprising a front portion, a rear portion, two side portions, and two side tabs, each side tab extending rearwardly from one of the side portions of the bezel and supporting the rear portion at a position that is rearwardly offset from the side portions and the front portion; and
wherein the front portion of the bezel covers a front face of the main portion and the rear portion of the bezel covers a rear face of the rear cover, the rear face facing in a direction that is opposite to the front face and being offset therefrom.

7. The portable electronic device of claim 6, wherein the at least one fastener is positioned on the upper portion of the rear face so that the rear portion of the bezel provides cosmetic coverage to the at least one fastener.

8. The portable electronic device of claim 6, wherein the front portion, the rear portion and the two side portions form a ring.

9. The portable electronic device of claim 6, wherein the at least one fastener is a screw.

10. The portable electronic device of claim 6, wherein the bezel is attached to the lower housing by at least one bezel fastener.

11. The portable electronic device of claim 6, wherein the bezel is made of a non-conductive vacuum metallization material so as to inhibit radio frequency interference of the portable electronic device.

* * * * *